United States Patent [19]

Loiseaux et al.

[11] Patent Number: 5,621,547

[45] Date of Patent: Apr. 15, 1997

[54] ILLUMINATION DEVICE AND APPLICATION TO A DISPLAY DEVICE

[75] Inventors: Brigitte Loiseaux, Villebon Sur Yvette; Jean-Pierre Huignard; Christophe Nicolas, both of Paris; Claude Puech, Ballainvilliers, all of France

[73] Assignee: Thomson-CSF, Puteaux, France

[21] Appl. No.: 489,731

[22] Filed: Jun. 13, 1995

Related U.S. Application Data

[63] Continuation of Ser. No. 862,537, Jun. 23, 1992, filed as PCT/FR91/00904, Nov. 15, 1991.

[30] Foreign Application Priority Data

Nov. 23, 1990 [FR] France ................... 90 14620

[51] Int. Cl.⁶ .................. G03H 1/00; G02B 27/10; G02B 5/32
[52] U.S. Cl. ................. 359/15; 359/1; 359/619; 359/620; 359/625; 359/626
[58] Field of Search .................. 359/1, 15, 19, 359/483, 485, 487, 488, 495, 619, 620, 625, 626

[56] References Cited

U.S. PATENT DOCUMENTS

| 3,622,220 | 11/1971 | Kogelnik | 359/487 |
| 5,009,502 | 4/1991 | Shih et al. | 356/152 |
| 5,410,421 | 4/1995 | Huignard | 359/15 |

OTHER PUBLICATIONS

IBM Technical Disclosure Bulletin vol 31 No. 3 Aug. 1988 "Three–Beam Optical Detection For Magneto–Optic Storage Using Holography"; pp. 12–13.

Primary Examiner—Georgia Y. Epps
Assistant Examiner—Ricky Mack
Attorney, Agent, or Firm—Oblon, Spivak, McClelland, Maier & Neustadt, P.C.

[57] ABSTRACT

The invention relates to an illumination device in which a holographic device ($HP_i$) separates the polarizations of an incident beam. The resulting polarized beam is transmitted to a holographic device ($HL_i$) focusing the beam at various points of a screen. This screen may be a liquid-crystal screen (LCD).

Applications: Liquid-crystal display.

1 Claim, 10 Drawing Sheets

FIG. 4d
$\lambda = \lambda_i + \Delta\lambda$
$\Delta\lambda = 20\,nm$

FIG. 4e

FIG. 4b
$\lambda_i = 0.55\,\mu m$

FIG. 4c

BLUE COMPONENT
$\lambda_B = 0.46 \mu m$

FIG. 5a

GREEN COMPONENT
$\lambda_G = 0.55 \mu m$

FIG. 5b

RED COMPONENT
$\lambda_R = 0.68 \mu m$

FIG. 8b $V \equiv d \cdot \Delta n$ = dimension   $\Delta\theta$ reflection   $\Delta\theta$ Transmission
$\Delta\lambda$ reflection   $\Delta\lambda$ Transmission

ILLUMINATION DEVICE AND APPLICATION TO A DISPLAY DEVICE

This is a Continuation of application Ser. No. 07/862,537, filed on Jun. 23, 1992, filed as PCT/FR91/00904 on Nov. 15, 1991.

BACKGROUND OF THE INVENTION

The invention relates to an illumination device and its application to a display device. It is especially applicable to polarisation splitting, to focusing and to spectral splitting of a light beam as well as enlargement of a beam by anamorphosis.

Especially, it finds one particular application in display using a monochromatic and trichromatic liquid-crystal screen.

In order to generate large-size video images, the current tendency is to use liquid-crystal active matrices in projection devices.

The projection of coloured images can be achieved either from 3 monochromatic valves or from a single valve fitted with colour filters.

These image-projection techniques, which are appealing for their compactness if they are compared to cathode-ray tubes, have the drawback of having a poor light yield of the order of a few percent. The principal limiting causes being the following:

The electrooptic effect in the liquid crystal requires working with polarised light and leads to a loss of 50% of the light emitted by the source to which it is necessary to add the absorption of the polarisers.

The useful surface of each pixel is reduced because of the space occupied by the transistor and the control electrodes. This factor constitutes the principal limitation for devices using small-size and high-resolution cells (spacing of the pixels <100 µm) which will be required for HDTV needs.

Projection solutions using a single valve have the advantage of being implemented in particularly simple devices. On the other hand, they lead to a loss of luminosity by a factor of at least three for each of the three chromatic components, a loss imposed by the spatial distribution of the colour filters. Since the non-negligible absorption of these filters is incompatible with the use of intense light sources, projection devices having one valve are therefore currently limited to the projection of small-size colour images.

The 16/9 format of HDTV, very poorly suited to the emission diagram of the light sources, leads to the search for architectures which include beam-anamorphosis functions.

This is why the invention relates to an illumination device characterised in that it comprises a holographic polarisation-splitting device illuminated by a non-polarised light source and a holographic focusing device receiving a polarised beam from the holographic polarisation-splitting device and enabling this beam to be focused.

Such an illumination source is applicable to the display of a liquid-crystal device which requires a polarised light.

SUMMARY OF THE INVENTION

The invention therefore also relates to a display device characterised in that it comprises a liquid-crystal screen receiving the beam focused by the holographic focusing device.

The holographic components are obtained by interference and enable complex optical functions to be provided in thin films such as is described in the document: "L. Solymar, D. J. Cooke, Volume Holography and Volume Grating—Academic Press (1981).

The properties of these holographic components in terms of angular, spectral or polarization selectivity are described by way of the coupled-wave formalism in the document: H. Kogelnik, Bell Syst. Tech. J. 48, p. 2909 (1969).

Figure 8A:
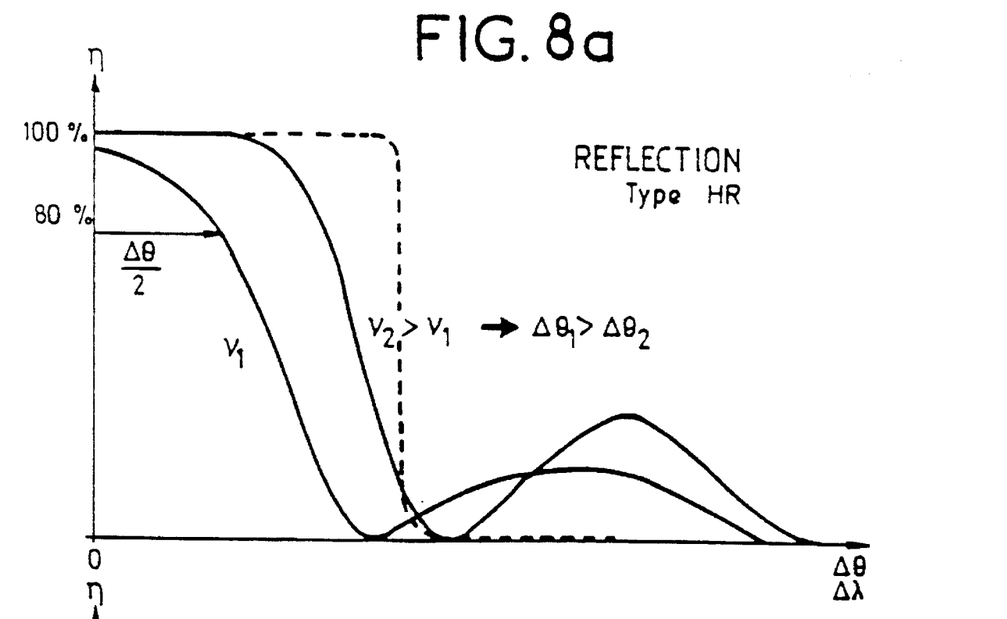
FIGS. 8a and 8b, diagrams for operation of components either in reflection mode or in transmission mode.
Figure 8B:
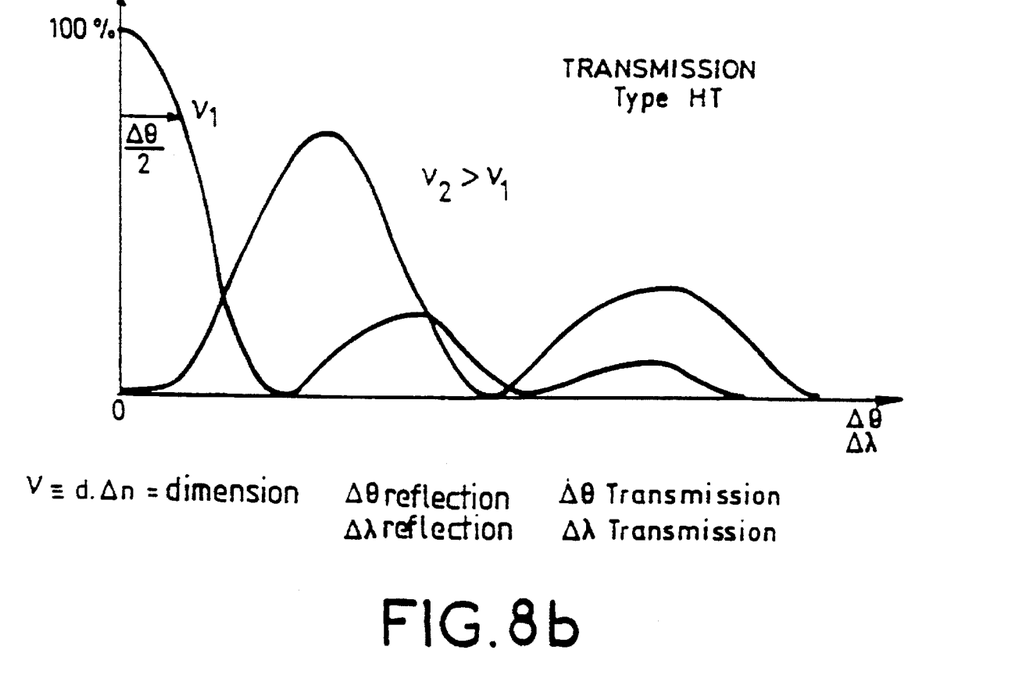

Their importance for use with a white source of the type used in projection devices may be summarised as follows:

as is illustrated in FIGS. 8a and 8b, angular $\Delta\Theta_o=7.5°$ (in air) and spectral $\Delta\lambda=40$ nm pass-bands are obtained in structures, of approximately 10 µm thickness (d) and having an index variation $\Delta n$ of approximately 0.03, operating in reflection mode (HR type) or operating in transmission mode (HT type). They are consequently compatible with trichromatic sources of the arc-lamp type ($\Delta\lambda_i=10$ nm; the typical diameter of the 3 mm sources collimated with the aid of a 30 mm focal-length condenser and opened to f/1 corresponds to an angular divergence $\Delta\Theta_o=6°$).

The polarising holographic functions have the same angular and spectral pass-band properties.

The "slanted" holographic functions (grating inclined at an angle $\phi$ in the thickness) enable the chromatic dispersion to be limited ($\delta\Theta_\lambda \approx 1$ mrd/nm).

The various aims and characteristics of the invention will appear more clearly in the description which will follow, given by way of example, and in the attached figures which represent:

DETAILED DESCRIPTION OF THE DRAWINGS

Photopolymeric materials exist, such as those known under the Du Pont de Nemours trademarks or the Polaroid photopolymers (DMP-128), which have a resolution sufficient for recording structures in reflection mode ($\Lambda<1$ µm) with photo-induced index variations which can reach $10^{-1}$, which permit the superposition of several holographic functions in one and the same film. We have shown previously that an index variation of $3.10^{-2}$ per spectral component is sufficient for providing an angular and spectral pass-band suited to one of the three components of the source and without affecting the other two.

The importance of photopolymeric materials in relation to standard materials of the bichromated gelatine type, apart from the simplicity of the process, resides in the possibility of sensitising it indiscriminately throughout the entire visible range. Consequently, the holographic functions in these materials will be able to be recorded, with the aid of a tunable laser for example, for each of the three respective operating wavelengths. The absence of wavelength change, between recording and reading, considerably limits the aberrations of the holographic components.

Such holographic devices may therefore be used in order to produce polarised-light illumination devices focusing several colour components at one or several points.

Such illumination devices will be described in the following, in terms of application to display using liquid-crystal screens.

Figure 1:
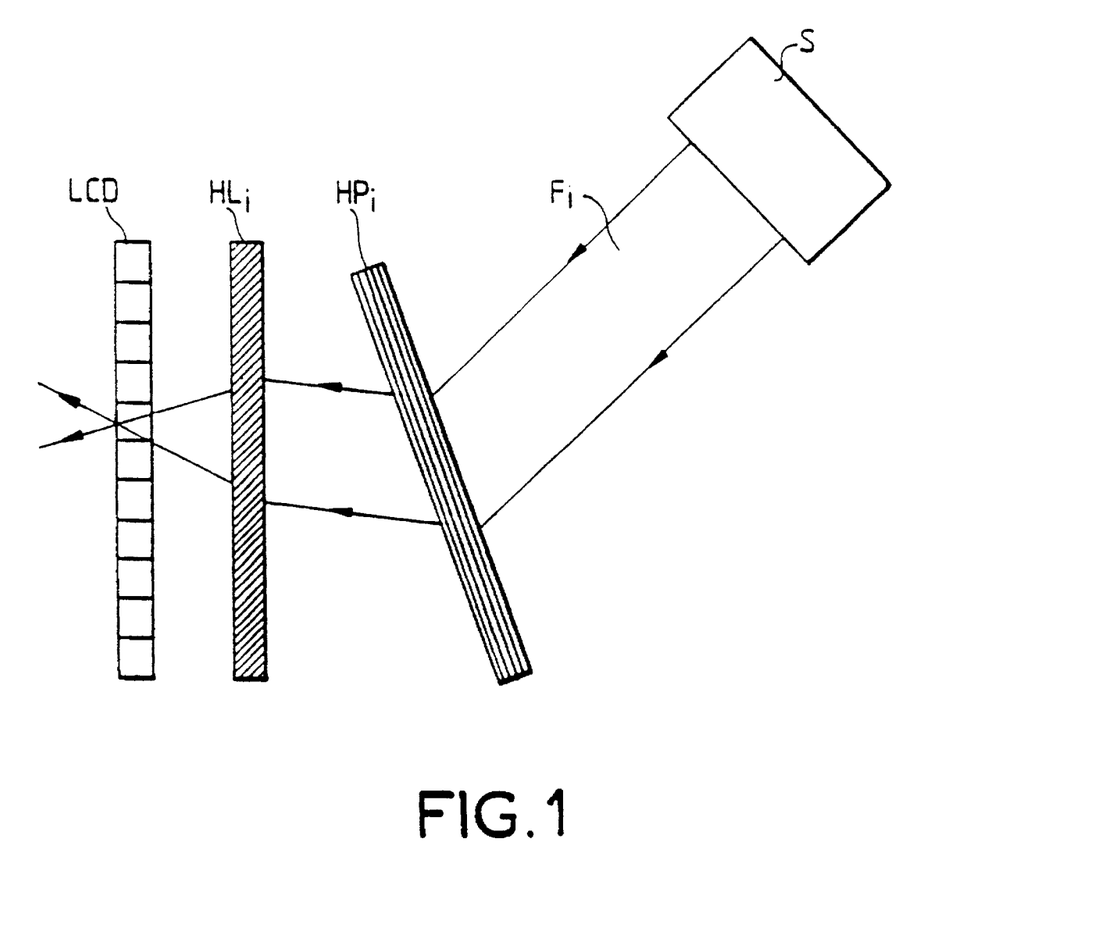
FIG. 1, a simplified exemplary embodiment of the device of the invention.

FIG. 1 shows a simplified exemplary embodiment of a display device according to the invention. This device comprises:

- a light source 5 emitting a light beam $F_i$ which may quite simply be a white, non-polarised and collimated light source,
- a holographic polarisation device $HP_i$ receiving the light beam $F_i$ and recorded in such a way that, for the angle of incidence of the beam $F_i$, it retransmits (reflected in FIG. 2) a polarised-light beam along a determined direction,
- a holographic focusing device $HL_i$ receiving the polarised light beam transmitted by the device $HP_i$ and recorded in such a way that it transmits at least a convergent beam. However, this focusing device HL is not essential and may not exist in the device of the invention;
- a liquid-crystal matrix-configured screen LCD receiving the convergent beam and placed substantially at the focal point of this beam.

The liquid-crystal screen LCD normally possesses several image elements (pixels). The holographic focusing device is recorded so as to transmit, in exchange for the polarised beam which it receives, as many beams as there are image elements, each of these beams being substantially focused at the centre of an image element.

The light beam $F_i$ of the source has to make an appropriate angle of incidence with the plane of incidence of the holographic polarisation device $HP_i$. Likewise, the polarised beam transmitted by the device $HP_i$ has to make an appropriate angle with the holographic focusing device $HL_i$.

In the device of FIG. 1, the holographic focusing device $HL_i$ has been placed parallel to the liquid-crystal screen LCD in such a way that the various beams transmitted by $HL_i$ focus onto one cell of the screen LCD.

The position of the holographic polarisation device $HP_i$ in relation to the direction of the beam $F_i$ emitted by the source and in relation to the holographic focusing device $HL_i$, is determined by the recording conditions of the hologram. Likewise, in FIG. 1, the holographic device $HP_i$ operates in transmission mode but it could operate in reflection mode. Likewise, the holographic device $HL_i$, which operates in transmission mode, could operate in reflection mode.

The cross-section of the beam $F_i$ may be of different shape from that of the screen LCD. In particular, the cross-section of the beam $F_i$ may be circular or square whereas the screen LCD may be rectangular (16×9 format). In order to have uniform illumination of the screen, it is necessary to carry out an anamorphosis of the beam. This anamorphosis is made either by the device $HP_i$ or by the device $HL_i$, taking into account that these devices may easily work off axis, that is to say outside the laws of reflection (DESCARTES' laws).

Figure 2:
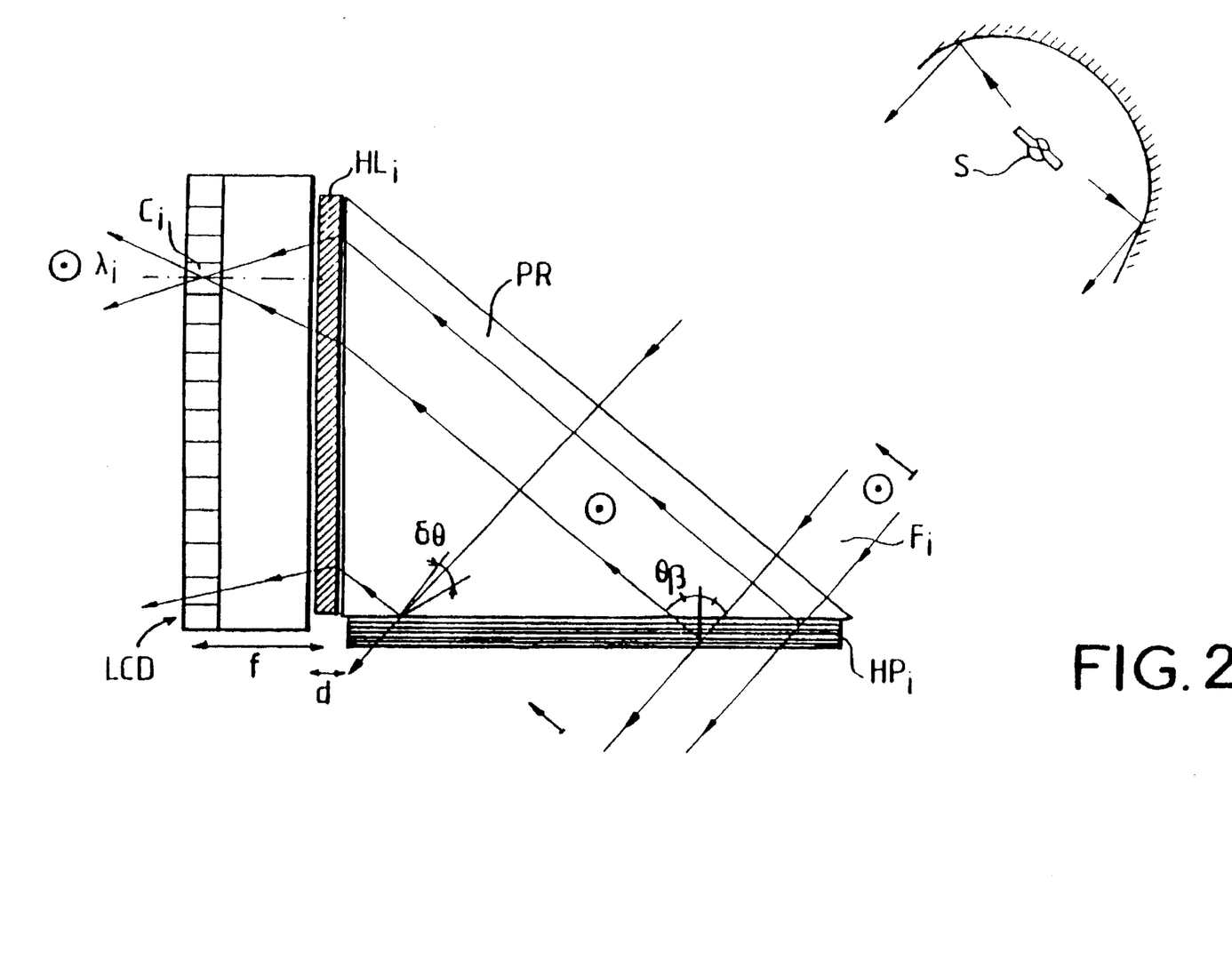
FIG. 2, an exemplary embodiment of the invention operating in monochromatic mode.

FIG. 2 shows a particular exemplary embodiment of the device of the invention.

This device combines, on a prism PR of approximately 45° angle, the holographic device $HP_i$ and the holographic focusing device $HL_i$.

The screen LCD is placed virtually on the matrix $HL_i$ in order to limit the geometrical extent of the image of the source S to a size close to the useful surface of the pixel, taking into account the angular divergencies already mentioned ($\Delta\theta=\pm 2°$) (in the medium of index n).

Figure 4A:
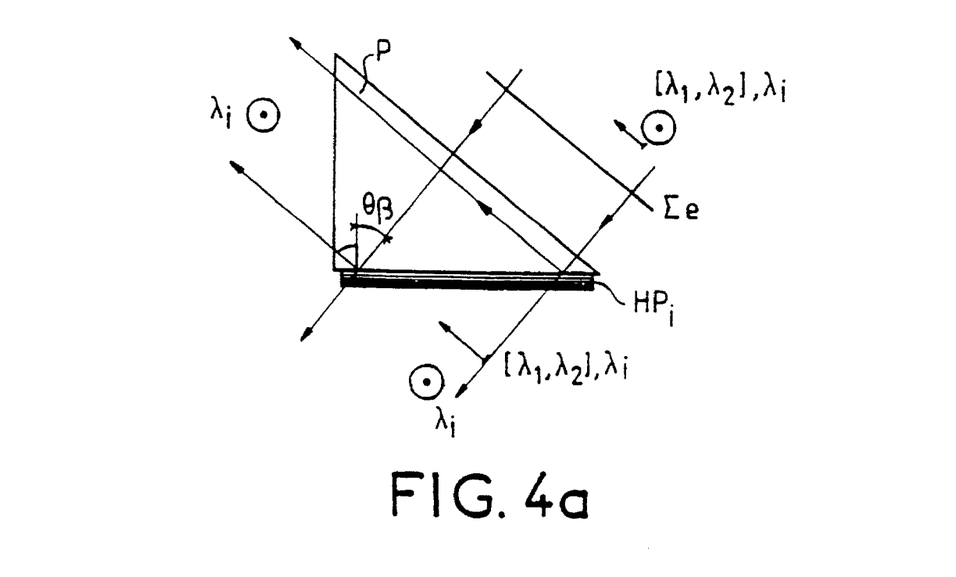
FIGS. 4a to 4e, the operating points and characteristics of a holographic polarisation device.
Figure 4B:
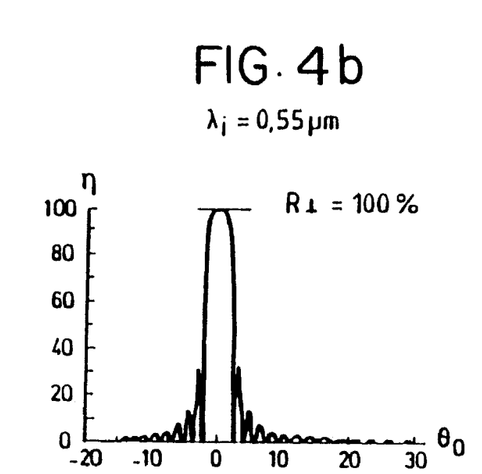
Figure 4C:
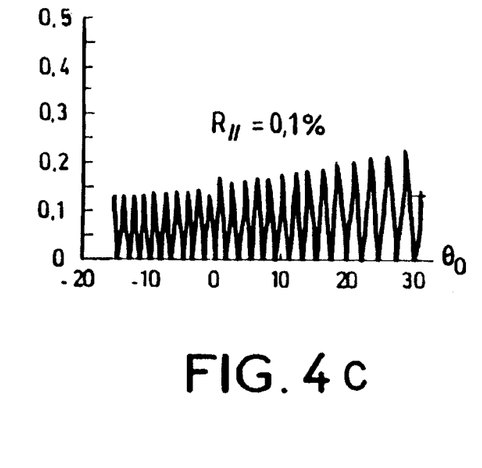
Figure 4D:
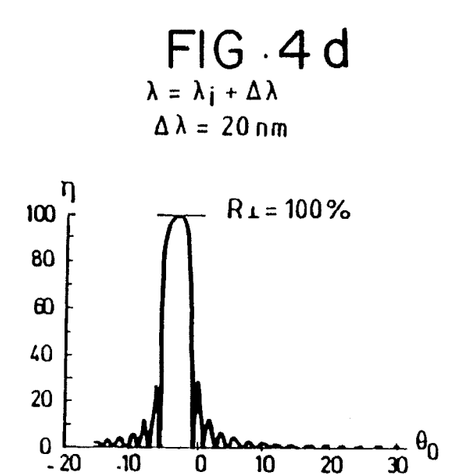
Figure 4E:
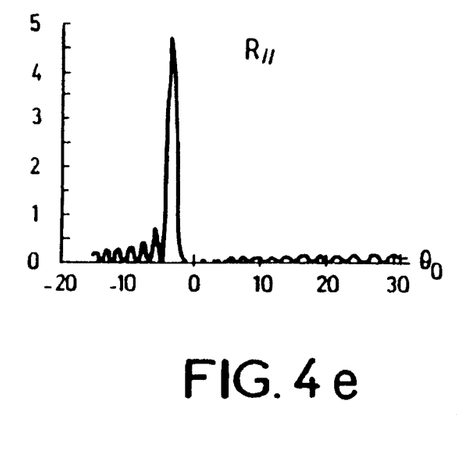

The polariser $HP_i$ is a holographic component of the type described in FIGS. 4a to 4c. It may be recorded onto a film of photosensitive material directly deposited onto one of the faces of the cube. Its operation in the previously described device permits the reflection of the light polarized perpendicularly to the plane of incidence (⊙ notation) centred about the chromatic component of the source at the wavelength $\lambda_i$ for which the component has been recorded and in the vicinity of the recording angle. It also operates for another wavelength $\lambda_j$—angle of incidence $\Theta_1$ pair for which the Bragg relationship remains satisfied, taking into account the recording conditions.

An angular $\Delta\Theta=5°$ and spectral $\Delta\lambda=20$ nm pass-band is typically found, for which the diffraction efficiency is greater than 50% under the following conditions:

$\Delta n=0.035$: photo-induced index variation
d=12 m: thickness of a material
$\Lambda \approx 0.26$ m: spacing of the fringes
$\Theta_B=45°$ at $\lambda=0.55$ µm: average operating angle.

The component $HL_i$ is intended to focus the chromatic component $\lambda_i$ onto one image element Ci of the screen LCD whose electrical actuation is associated with $\lambda_i$. The component $HL_i$ is therefore equivalent to a matrix of imbricated microlenses, the 100% filling level of which is allowed by the principle for superposing holograms, but impossible to produce by conventional optical means. Each of these lenses operates off axis, which has the following two advantages:

preserving the anamorphosis of the cylindrical illuminating beam in a format close to 16/9 which is obtained by the 45° reflection in the prism on the focusing device $HP_i$, limiting the chromatic dispersion of the device $HL_i$ since the HT-type grating consists of strata inclined in relation to the surface of the support medium of the device.

It should be specified here, as regards the anamorphosis, that the incident beam $F_i$ may form an angle of incidence in the plane of the device $HP_i$ different from 45°. Since the holographic grating is recorded so as to satisfy the reflection conditions, an anamorphosis of the beam is obtained on reflection.

One exemplary embodiment is given here of a matrix of holographic microlenses which are compatible with image elements of the screen LCD at the 100 µm spacing. This matrix will be recorded in a photosensitive layer with the aid of a mask $M_i$ and reconstituted by placing the screen LCD in the place of the mask $M_i$. The mask $M_i$ may, however, be the screen LCD itself or an equivalent mask (possibly a holographic mask). The focal length of these microlenses being therefore imposed by the thickness of the counter-electrode of the screen LCD and of its support medium, typically f=1 mm.

The characteristics of an elementary microlenses of the matrix $HL_i$ may be:

f=1 mm: focal length of a microlens
$\phi_L$=0.3 mm: diameter of a microlens
$\Theta_B$=45°: reading angle of $HL_i$ (in the prism of index n=1.52)
$\Theta_d$=180°: average diffraction angle of $HL_i$
$\phi$=112.5: average diffraction inclination of $HL_i$
$\Lambda$ average=0.45 µm: average spacing of the strata of $HL_i$
$\Delta$n=0.03: photo-induced index variation
d=7 µm : thickness of $HL_i$.

This lens works at infinity and its focus and size $\Delta$x of the focal spot may be calculated approximately with the aid of the diffraction spot $\Delta$x (diff) and of the divergence of the reading wavelength $\lambda$, leading to an enlargement $\Delta$x (div):

$$\Delta x = \Delta x(diff) + \Delta x(div)$$

In the example taken, if $\Delta\Theta = \pm 2°$ is considered always to be the case, then:

$$\Delta x(diff) = 4.5 \ \mu m$$

$$\Delta x(div) \approx 2f\Delta\Theta = 72 \ \mu m$$

$$\Delta x \approx 76 \ \mu m$$

In these types of architectures, the light yield of the projected image will not be affected by the useful surface of each pixel while its transmission coefficient is greater than 45% for the example given.

In order to produce the recording of the matrix of microlenses in the holographic focusing device $HL_i$, a mask is used for example.

This mask is a mask of the same type as that used for producing the matrix of electrodes of the screen LCD. Only the dimension $\phi_M$ of the transparent pixel of the mask has to be adapted to the divergence of the microlens which is to be recorded. In the example, the situation will therefore be such that:

$$\phi_M \approx 2\lambda f, \phi_L = 4.5 \ \mu m$$

The location of the transparent image element of the mask corresponding to the image element of the screen (LCD) is addressed by the actuation of the screen.

The mask may also be a liquid-crystal screen illuminated at the length $\lambda_i$ of the source and addressed electrically in order to record the matrix $HL_i$.

As has already been noted, the exemplary embodiment of the invention provides a focusing device (HL) produced in the form of a matrix of microlenses. Provision is also made for not having a focusing device in the device of the invention.

The device of FIG. 2 operates in the following manner:
The source S uniformly illuminates a holographic polarisation device $HP_i$. The beam $F_i$ enters into the prism PR perpendicularly to the entrant face. One polarisation component is retransmitted virtually without being deviated whereas the other component is reflected. The reflected beam is transmitted to the holographic focusing device $HL_i$ which focuses it onto the various image elements of the screen LCD. Moreover, the screen LCD is actuated by means, which are not shown, for displaying an image.

In the above, consideration has been given to operating at a single wavelength $\lambda_i$ (monochromatic operation) and the device $HL_i$ has been recorded in order to focus one wavelength $\lambda_i$.

The device may also operate with several wavelengths, especially with three wavelengths (trichromatic operation) corresponding to the blue (0.46 µm), green (0.55 µm) and red (0.68 µm) wavelengths for example.

Figure 3:
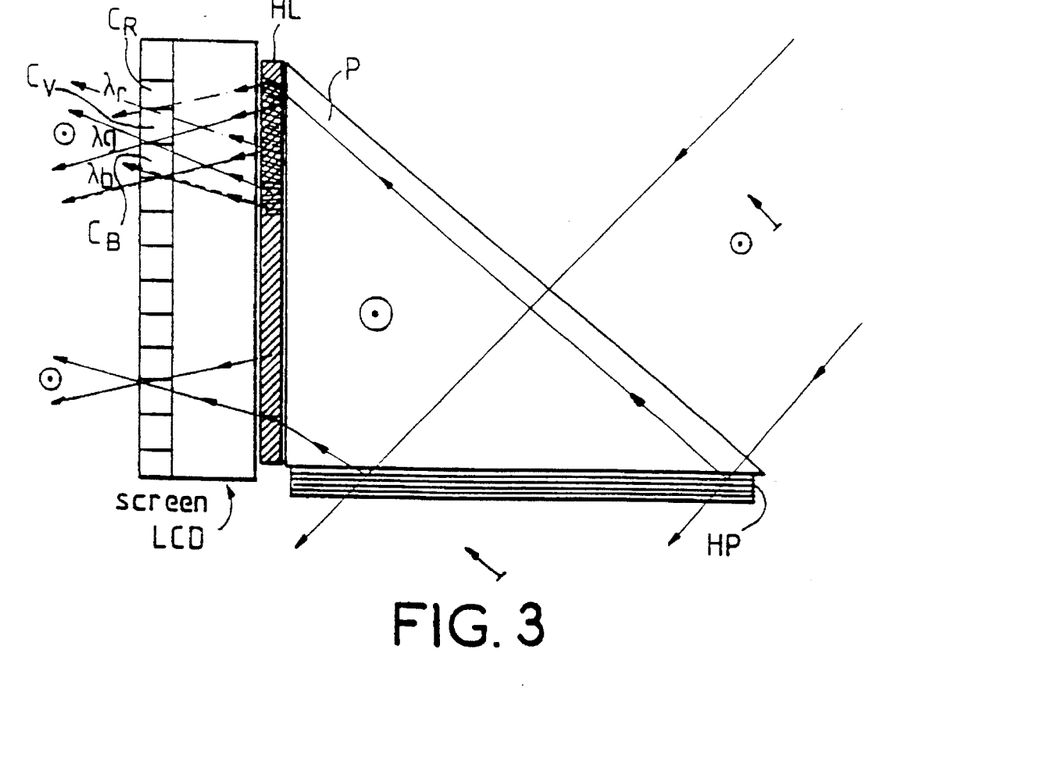
FIG. 3, an exemplary embodiment of the invention operating in trichromatic mode.

FIG. 3 illustrates such a trichromatic system. In this system, the screen LCD possesses, for each image element, an image cell $C_B$ intended to modulate a wavelength corresponding to blue, an image cell $C_G$ intended to modulate a wavelength corresponding to green and an image cell $C_R$ intended to modulate a wavelength corresponding to red. In FIG. 3, these cells have been shown in an enlarged manner, but three cells thus joined together may only correspond in size to a single image element of FIG. 2.

The holographic focusing device HL has been recorded in order to focus the component of wavelength corresponding to blue, which component is contained in the beam retransmitted by the device HP onto the blue-modulating cells of the screen LCD. Likewise, it has to focus the green component onto the green-modulating cells and the red component onto the red-modulating cells.

Figure 5A:
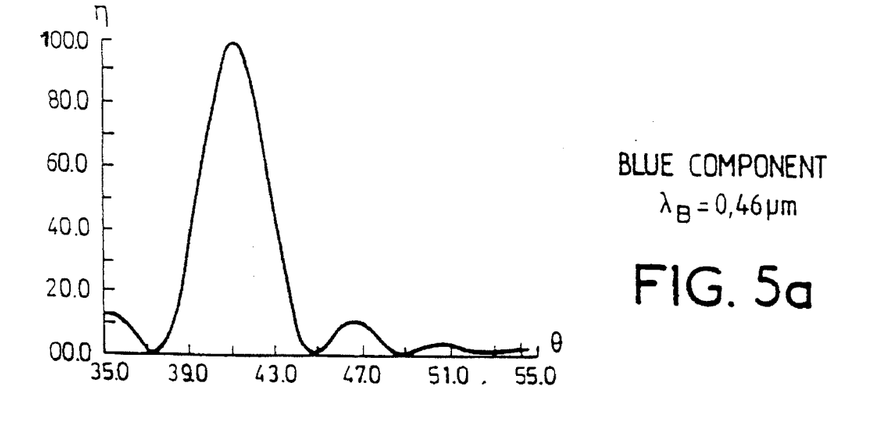
FIGS. 5a to 5c, diagrams for operation in blue, green, red colours.
Figure 5B:
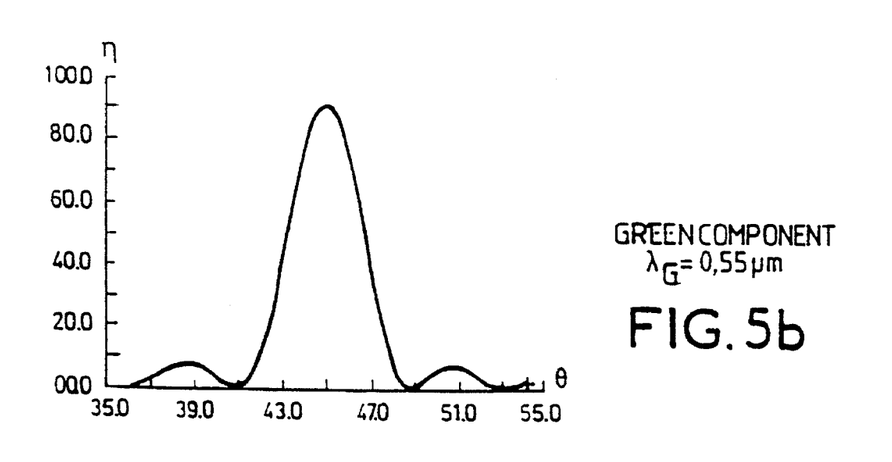
Figure 5C:
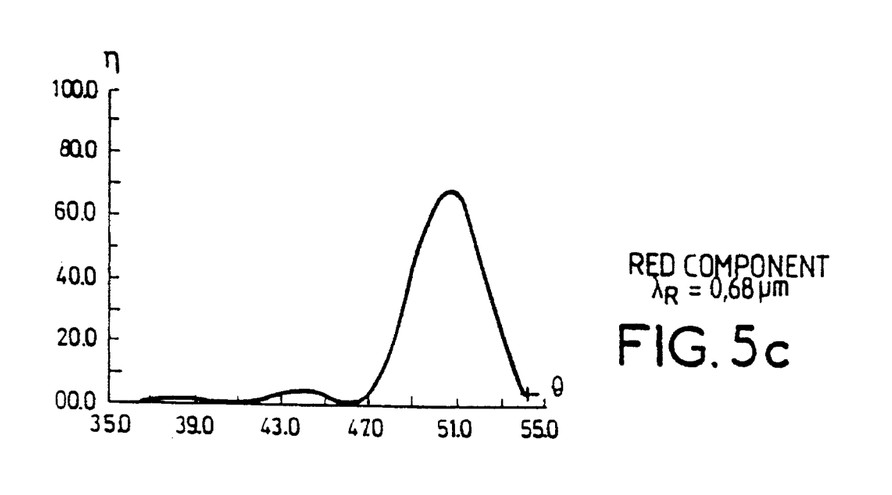

The angular and spectral pass-bands for the three chromatic components of the source S are given in FIGS. 5a to 5c.

In order to record such a hologram in HL, a mask produced in the same manner as the liquid-crystal screen LCD is used. This mask will be, for example, a liquid-crystal screen. The location of one image element of the mask corresponding to one colour and corresponding to one image element of the screen LCD is addressed by the actuation of the chromatic component of the colour in question of the masking liquid-crystal screen.

Figure 6:
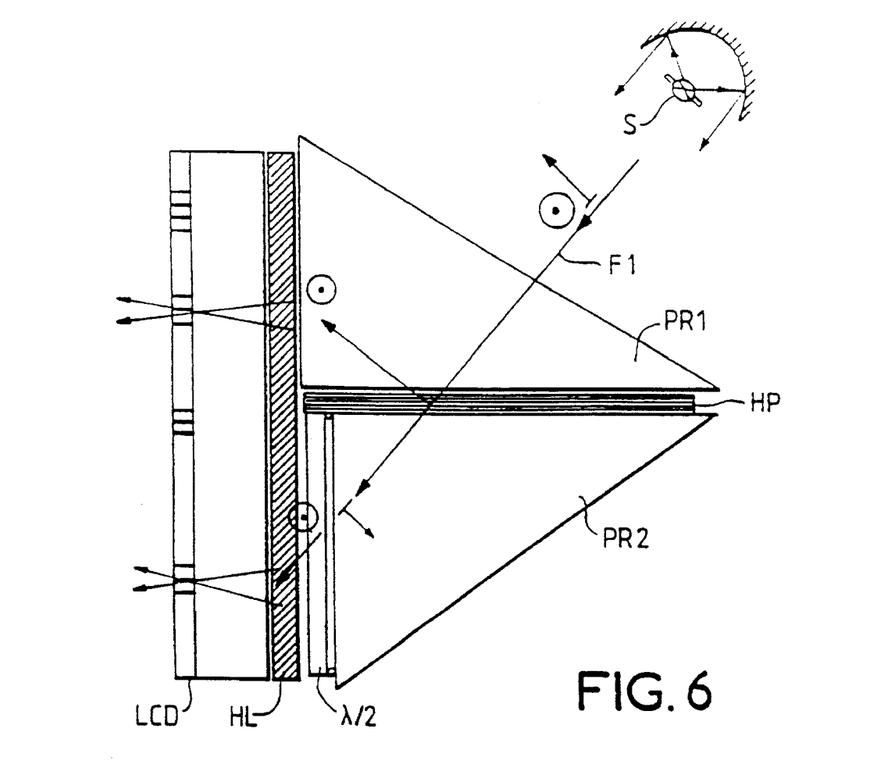
FIG. 6, an alternative embodiment of the devices of FIGS. 2 and 3 improving the projection yield.

The device of FIG. 6 is a variant of the preceding devices in which the light reflected by the polarisation device HP illuminates a portion (half, for example) of the focusing device HL and of the screen LCD.

The light which is not reflected (polarisation parallel to the plane of incidence) and which is transmitted by the polarisation device HP illuminates the other portion of the focusing device and the other portion of the screen. All the light from the source may therefore be used.

It is possible to provide a half-wave plate $\lambda$/2 which rotates the polarisation of the light illuminating one of the portions of the screen. In FIG. 6, this half-wave plate is placed in the path of the beam transmitted by the device HP. The screen LCD is then electrically actuated in a uniform manner over its entire surface. Advantageously, the half-wave plate may be a passive liquid-crystal cell operating in the (chromatic) waveguide mode. This half-wave plate could be placed in the path of the reflected beam instead of the beam transmitted by the device HP. Preferably, this half-wave plate could also be placed so as to be perpendicular to the beam, for example as in the case of FIG. 9 which will be described subsequently.

It is also possible not to provide the half-wave plate. In this case, the two portions of the screen are therefore illuminated by light beams of orthogonal polarisations. It is then possible to actuate the two portions of the screen in a reverse manner.

Figure 7:
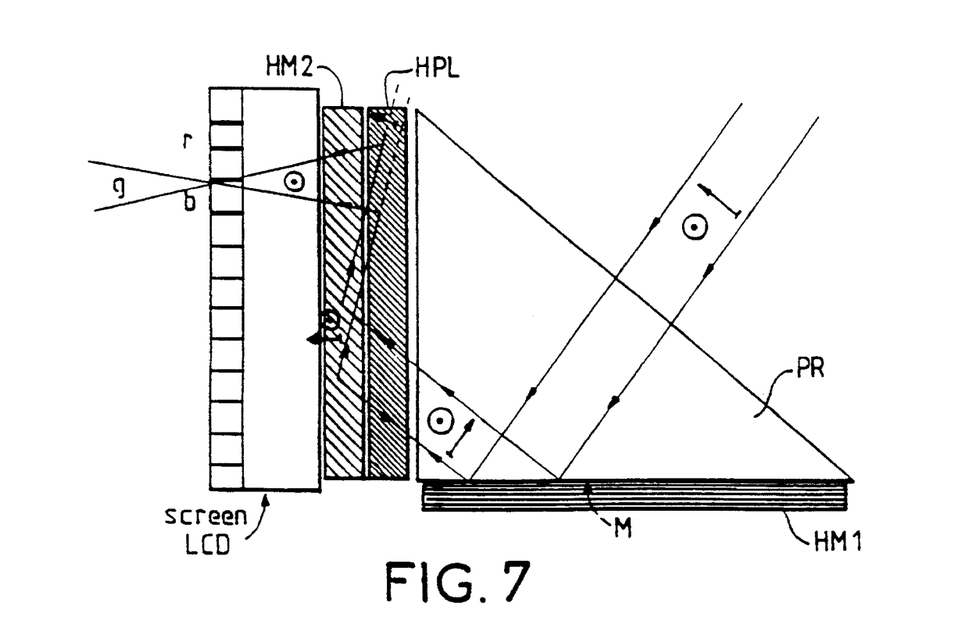
FIG. 7, another detailed exemplary embodiment of the device according to the invention.

FIG. 7 shows an exemplary embodiment of the device of the invention in which the matrix HPL is a hologram operating in reflection mode (HR type) and simultaneously having polarisation properties.

The screen LCD being always placed against the component HPL, functions HM2, of holographic-mirror type, are introduced into the device. The device of FIG. 7 uses a prism PR operating in total-reflection mode on one of its faces. The other face comprising, in succession, from right to left, a holographic matrix of polarising microlenses HPL a holographic mirror HM2 and the screen LCD. It should be noted that the device HPL could also be a polarising holographic device without recording of microlenses.

The operating principle of this device is based on the exploitation of the narrow spectral selectivity properties of the reflection-mode holographic structures. It is described as follows:

The collimated illuminating beam is totally reflected by the face M of the prism PR which produces, if desired, an anamorphosis to the 16/9 format for example. This reflection may be performed by a hologram HM1. The beam traverses HPL a first time, without being diffracted, at an incidence such that there is Bragg incidence for HM2 and non-Bragg incidence for HPL. It is then totally reflected by HM2, HM2 having been recorded in order to reflect this beam at the Bragg incidence for HPL. That portion of the wave polarised perpendicularly to the plane of incidence is then efficiently diffracted by HPL in order to be focused onto the pixels of the screen LCD. The component HM is then traversed a second time without diffraction since this time it is at a non-Bragg incidence.

It will be noted that the face M of the prism PR is not necessarily produced with a holographic component, this may involve either a metallic or dielectric reflection or a total reflection at the interface of the air-glass diopter.

A structure has been presented here in which the polarising function is produced on the lens function. It will be noted that it may be produced indiscriminately in HM2 or once again on M as in the device of FIGS. 2 and 3, if this component is holographic.

By way of exemplary embodiment of the device of FIG. 7, a non-restricting example is presented here of a combination of two components HPL and HM2 aiming to demonstrate the compatibility of the spectral and angular bands of these components. The angular and spectral selectivity properties of the holographic devices, combined with a small-size white source, enable chromatic dispersions of the holographic components to be overcome.

In this type of single unit construction, the holographic properties (angular and spectral selectivities) enable the use of dichroic mirrors to be avoided.

Matrix of Polarising Microlenses HPL $f = 1$ mm   $\theta_L = 0.3$ mm (focal length and aperture of a μ-lens)

$\bar{\theta}_B = 63°$   $\bar{\theta}_d = 0$ at $\lambda = 0.55$ μm (respectively reading and average diffraction angle)

$\phi = 37.5°$   $\Delta n = 0.025$   $d = 12$ μm $\Lambda_{average} = 0.24$ μm

Holorgraphic Mirror HM2

$\theta_B = -27°$   $\theta_d = 63°$ at $\lambda = 0.55$ μm (reading and diffraction angle respectively)

$\theta = 162°$   $\Delta n = 0.05$   $d = 13$ μm $\Lambda = 0.26$ μm

Figure 9:
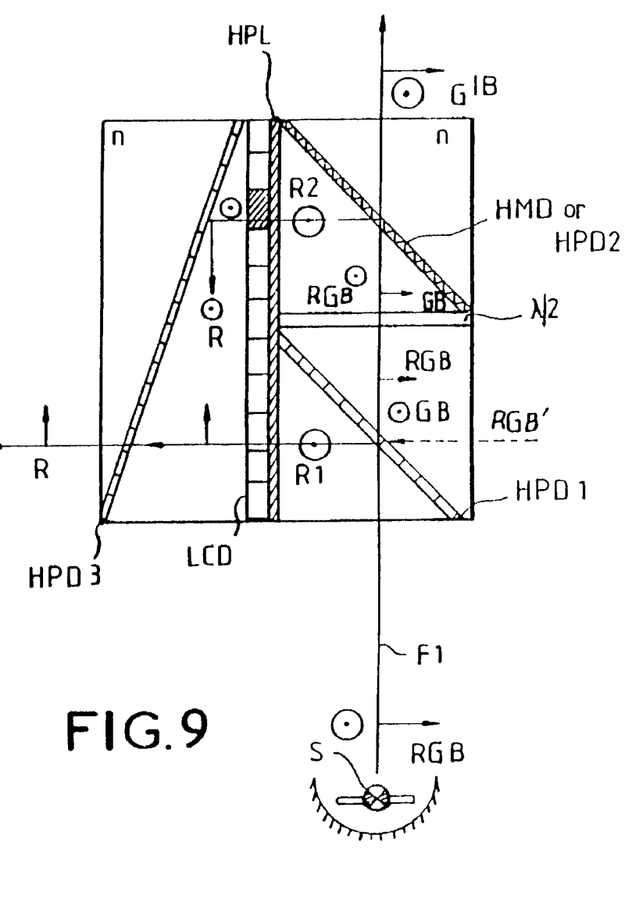
FIGS. 9 and 10, an alternative embodiment of the system of the invention.

FIG. 9 shows an alternative embodiment of the device of the invention. This device comprises a first polarisation-splitting device HPD1 disposed inclined (at 45°, for example) in relation to the screen LCD and enabling half of the screen LCD to be illuminated. It receives an incident beam RGB along a direction parallel to the screen LCD. It reflects towards the screen LCD one of the polarisations R1 of the incident beam at a determined wavelength (wavelength corresponding to red, for example). It retransmits without deflection the other polarisation R2 of the beam of the same wavelength (red) as well as the light at all the other wavelengths (especially those corresponding to green and to blue).

A second polarisation-splitting device HPD2 operating at the same wavelength as HPD1 (red in the example given) reflected the beam R2 towards the screen LCD. This splitting device may also be a holographic mirror operating at the wavelength to be reflected (red):

The screen LCD receives the beams R1 and R2 by way of a focusing device HL which, as has been described previously, focuses the light onto the various image elements of the screen LCD. However, it is also possible not to provide a focusing device HL. At the exit of the screen LCD a third polarisation-splitting device HPD3 allows light of a certain polarisation to pass and reflected (non transmission) light of perpendicular polarisation and this is carried out as a function of the image displayed by the screen LCD.

In addition, the two portions of the screen receiving the two beams R1 and R2 may be actuated in a reverse manner. Alternatively, it is possible to provide a plate λ/2 which rotates by 90° the polarisation of one of these beams. For example, as is shown in FIG. 9, the plate λ/2 is placed between the first polarisation-splitting device HPD and the second polarisation-splitting device HPD2.

The device of FIG. 9 operates at a single wavelength, or more precisely at a relatively narrow wavelength band. The light at other wavelengths is not deviated and emerges along the beam GB.

Figure 10:
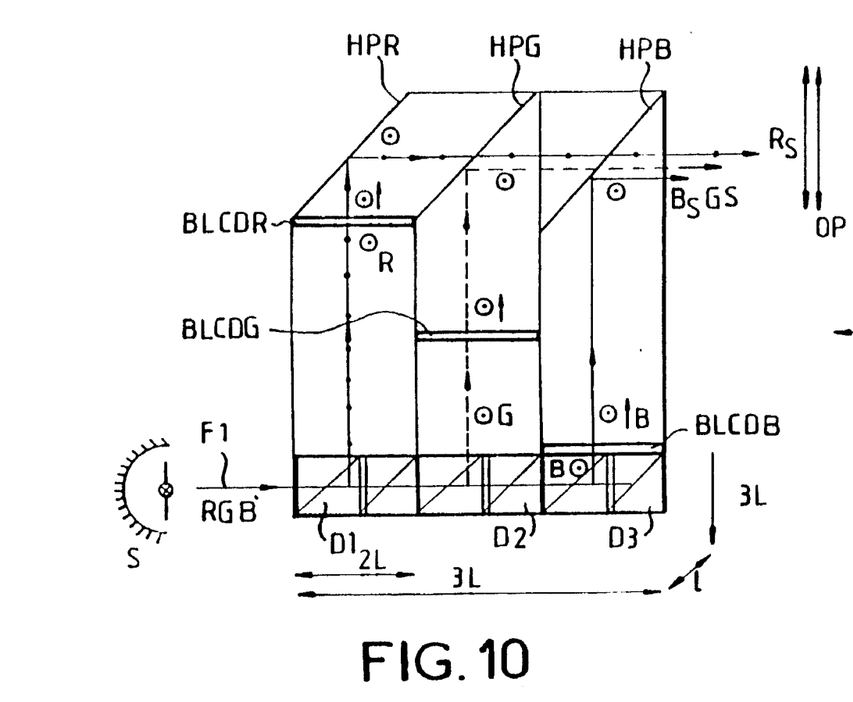

In order to process the other wavelengths, the invention provides for using other devices such as that of FIG. 9 according to a disposition shown in FIG. 10. In this FIG. 10, two other devices have been aligned on the direction of the beam GB. The first device is designed in order to process a wavelength band corresponding, for example, to green. It does not deviate light possessing a wavelength belonging to a third band, blue for example.

The three devices D1, D2, D3 thus process three different wavelength bands, that is to say bands corresponding respectively to red, to green and to blue.

The three beams issuing from the three devices D1, D2, D3 are superposed with the aid of three mirrors HPR, HPG, HPB receiving in parallel the three beams which are processed and disposed in series on the direction of the reflected beams so as to render colinear the three reflected beams $R_s$, $G_s$, $B_s$. These three beams are transmitted to an exit optical device OP.

In FIG. 9, the incident beam F1 is parallel to the plane of the screen LCD and this is useful if it is desired to dispose, as will be seen, in series several units of identical construction, such as that of FIG. 9. However, the incident beam RGB may be perpendicular to the plane of the screen LCD.

In addition, in FIG. 10, the various elements of the system are disposed so that the optical paths of the various beams are equal. The liquid-crystal screens LCDR, LCDG, LCDB, corresponding to the three processed wavelength bands are disposed at different distances from the devices D1, D2, D3.

For example, if it is assumed that the size of each device D1, D2, D3 along the direction of the beam RGB is equal to L, the screen LCDR is placed at a distance 2L from the device D1. The screen LCDG is placed at a distance L from the device D2 and the screen LCDB is virtually placed alongside the device D3.

The system of FIG. 10 thus enables the equidistance between, on the one hand, the source S and the liquid-crystal screens LCDR, LCDG and LCDB and, on the other hand, the liquid-crystal screens and the projection optical device, to be preserved.

The overall size of the system of FIG. 10 is approximately 3L×3L×1, L being the size of a device such as D1 in the direction of the beam BGR and 1, the dimension D1 perpendicularly to the plane of FIG. 10.

Figure 11:
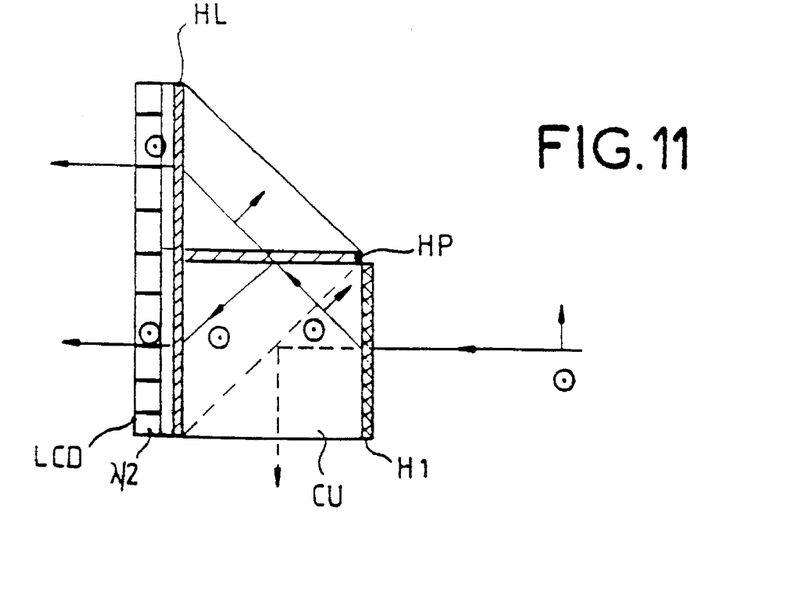
FIGS. 11, 12 and 13, alternative embodiments of the device of FIG. 6.

FIG. 11 shows an alternative embodiment of the system of FIG. 6 enabling equal paths to be obtained at all points from the source S as far as a screen LCD. This device, comprises, although this is not essential, the holographic focusing device HL placed alongside the screen LCD. The holographic polarization device HP is located in a plane central to the screen LCD and to the device HL. The entrant beam is such that its angle of incidence on the device HP is 45°. In order to obtain this angle of incidence, a cube CU is placed alongside the device HP by one face and receives the entrant beam by an adjacent face FA. Combined with this face FA is a holographic device H1 recorded in order to deviate the entrant beam so as to retransmit it at an incidence of substantially 45° to the device HP. The entrant beam is preferably perpendicular to the face FA and to the device H1.

By operating at several wavelengths (trichromatic operation), the holographic device H1 deflected the entrant beam having a wavelength located in a narrow band, green for example. The beams possessing other wavelengths are not deviated (beams FB and FR). However, the cube CU possesses a dichroic plate LBR reflecting these beams FB and FR towards the other display devices D'2 and D'3.

In the exemplary embodiment of FIG. 11, the dichroic plate LBR is downstream of the device H1 (in the cube CU), but it could also be upstream of the device H1.

Figure 12:
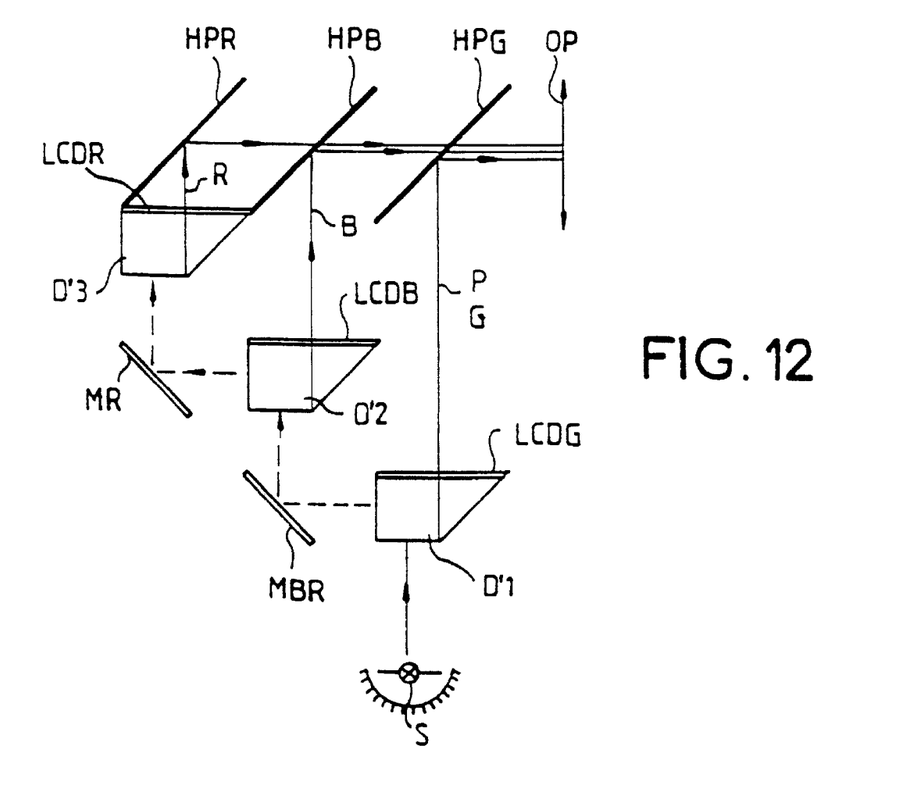

FIG. 12 shows an exemplary arrangement of these devices. In this arrangement, the liquid-crystal screens LCDG, LCDB and LCDR are disposed so as to be equidistant from the projection optical device OP.

The device D'2 operates at a wavelength band corresponding to blue. It is coupled to the device D'1 by a mirror MBR which may be a holographic mirror reflecting blue and red.

The device D'3 operates at a wavelength band corresponding to red. It is coupled to the device D'2 by a mirror MR.

The beams processed by the screens LCDG, LCDB and LCDR are rendered colinear as in the system of FIG. 10.

It should be noted that, if the screens LCDG, LCDB and LCDR are equidistant from the exit optical device OP, they are not equidistant from the source S in this exemplary embodiment. This may therefore induce differences of luminosity for the various colours because of the divergence of the beams. It is possible to remedy this by providing in the holographic devices divergence and/or convergence functions.

It is also possible to provide such divergence and/or convergence functions in each of the holographic devices of the various preceding exemplary embodiments.

For example, in FIG. 9, the various points of the screen LCD are not equidistant from the source S. If the illuminating beam is divergent, the illumination of the screen is not uniform. In order to remedy this, provision is made for including a convergence function in the device HMD for example.

According to a variant of the invention, it is possible to introduce a convergence or divergence function into the polarisation-splitting devices such as the devices HPD1 or HMD (or HPD2) of FIG. 9. The purpose of this convergence or divergence function is to compensate for the possible illumination inhomogeneities due especially to the fact that the screen LCD is illuminated in two portions and that the beams for illuminating these two portions travel different paths.

According to another alternative embodiment, the beam for illuminating the screen LCD makes an angle with the normal to the plane of the screen, it being possible for this angle to reach 10°. Under these conditions, in the various attached figures, it should be borne in mind that the various beams and the various devices make an angle in relation to the positions represented. This enables the contrast of the screen LCD to be optimised. For example, in the description of FIG. 9, the beam F1 may then not be parallel to the plane of the screen but make an angle.

According to another variant of the invention, all the elements of the device of the invention are not produced according to holographic techniques. For example, the dichroic splitters and the polarisers may be produced according to conventional optical techniques whilst providing a compatibility with elements produced holographically.

Figure 13:
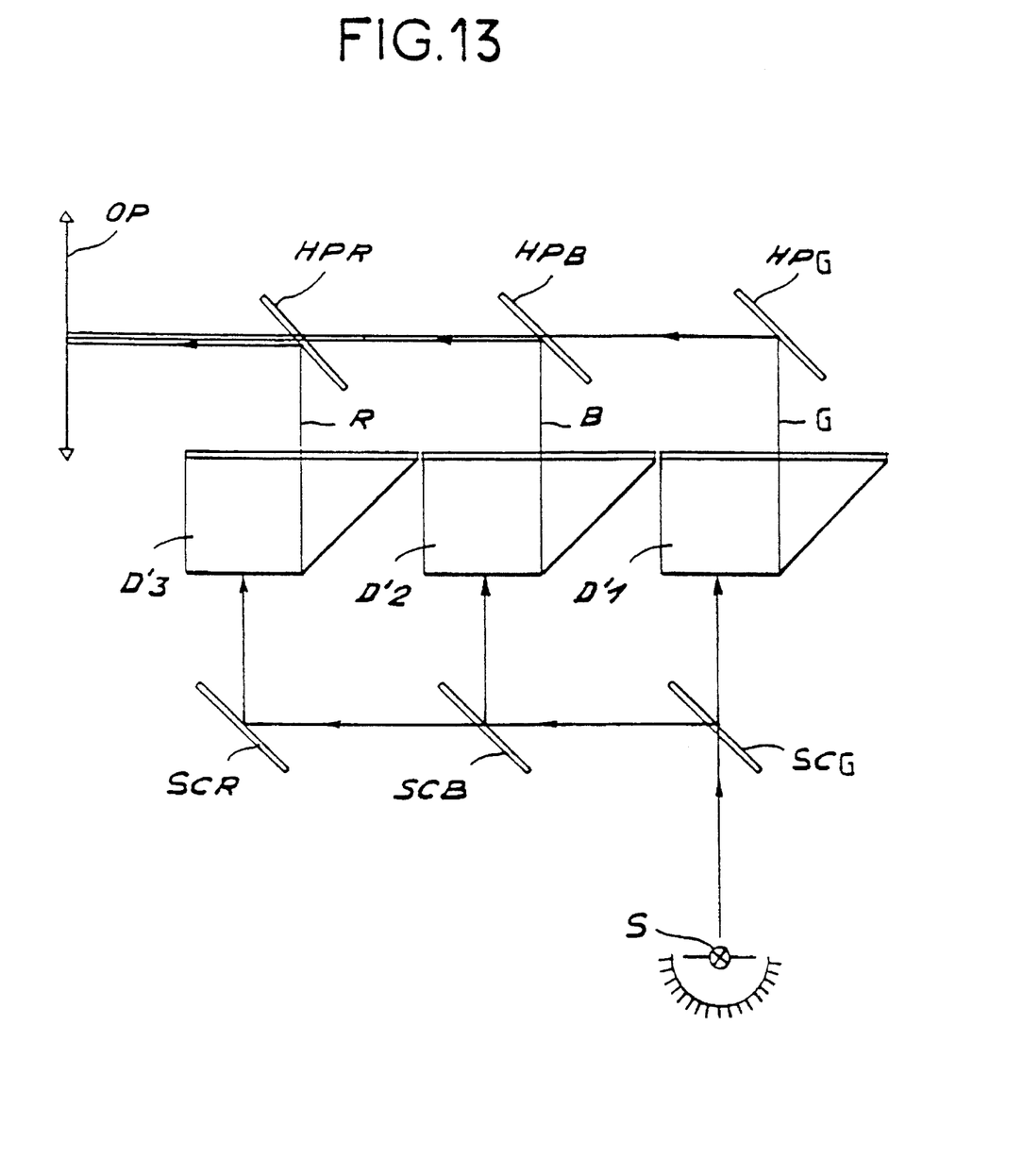

FIG. 13 shows an alternative embodiment of FIG. 12 in which the chromatic splitting is not provided in the devices D'1, D'2, D'3 but between these devices and the source.

As may be seen, a chromatic splitter SCG is provided which filters the wavelengths corresponding to green in order to transmit them to the device D'1. The other wavelengths are reflected towards another chromatic splitter SCB which reflects the wavelengths corresponding to blue towards the device D'2 and which transmits the other wavelengths corresponding to red to the device D'3 by way of a mirror SCR.

The devices D'1, D'2, D'3 are constituted in the same manner but do not comprise, unlike those of FIGS. 11 and 12, chromatic splitting plates (dichroic plate LBR) in the cube CU. The device H1 has no need to be wavelength selective in order to deviate the beam which it receives since the selection in terms of wavelength has already been made.

The devices D'1, D'2, D'3 may be placed side by side. At the exit, the mirrors HPG, HPB and HPR are oriented such that the three paths of the three processed wavelength bands are virtually equal.

The projection device according to the invention permits:

a significant gain in the light yield of the protector in relation to conventional structures:

By a factor of 3, arising from the absence of colour filters, the dichroic functions being produced by holographic components.

By a factor which may reach 2.2, arising from the focusing onto the pixels enabling the transmission level of the screen LCD (in the case of pixels having 100 μm spacing) to be overcome.

By a factor of 1.3, arising from the 100% filling level obtained with matrices of holographic lenses.

A significant gain is also expected in the efficiency of the holographic polariser compared to the wide spectral-band dielectric dichroic polarising cube.

The production of optical structures which are low in cost and can be optically copied from a master device.

The display devices according to the invention are therefore based on the use of liquid-crystal matrices LCD in a projecting system using holographic volume components. These matrices enable simultaneously:

the light yield for projection to be increased by exploiting the properties of the volume holograms which enable high diffraction efficiencies, which can reach the theoretical limit of 100%, and levels of polarisation reaching 1/1000 in the reflected and transmitted beams, to be obtained.

a complex optical function to be integrated in thin films of thickness less than 100 μm, which function produces both the polarisation HP of the illumination source, the selective focusing $HL_i$, in each of the pixels of the matrix, and the chromatic splitting of each of the three chromatic components $\lambda_i$, red-green-blue of the source.

There to be compatibility with industrial production requirements by using processes for duplicating holograms.

It is quite obvious that the above description has been made by way of example and that other variants may be envisaged without departing from the scope of the invention. In particular, the dispositions of the holographic devices and their inclinations in relation to the light beams to be processed as well as the nature of these holographic devices have only been indicated in order to illustrate the description. The invention has also been described, in its detailed exemplary embodiments shown by the figures, with application to a display system of a liquid-crystal screen. However, it will be recalled that the invention relates above all to an illumination device which is used in the examples shown for the illumination of the liquid-crystal screen, but there might be no liquid-crystal screen or there could be any other device. The production of the holographic devices is known in the technical field. It is known, for example, how to record in a permanent manner holograms operating with a high-intensity read beam.

We claim:

1. An illumination device for illuminating a display device, said illumination device comprising:

a non-polarized light source for emitting non-polarized light;

holographic polarization beam splitting means for receiving non-polarized light emitted from said non-polarized light source and for outputting first polarized light beams having a first polarization and second polarized light beam having a second polarization, said second polarization being orthogonal to said first polarization; and holographic focusing means for receiving one of said first polarized light beams and said second polarized light beams output from said holographic polarization beam splitting means and for focusing said one of said first polarized light beams and said second polarized light beams onto detector cells of a display device which is oriented in a plane parallel to a plane containing said holographic focusing means, said holographic focusing means having a matrix of microlenses, each microlens focusing a part of one of said first and second polarized light beams onto a detector cell.

* * * * *